Patented Dec. 23, 1952

2,622,975

UNITED STATES PATENT OFFICE 2,622,975

HERBICIDE

Percy W. Zimmerman and Albert E. Hitchcock, Yonkers, N. Y., assignors to Boyce Thompson Institute For Plant Research, Inc., Yonkers, N. Y., a corporation of New York No Drawing. Application June 30, 1950, Serial No. 171,572

1 Claim. (Cl. 71—2.7)

This invention relates to herbicides and has for its object the provision of an improved plant regulant composition having pronounced herbicidal properties and an improved method of killing or suppressing the growth of plants. The invention provides compositions comprising certain undecylenates and chloroacetic acid.

This invention is based upon our discovery that undecylenic acid and halogenated undecylenic acid, their salts, esters and amides and the corresponding aldehydes which oxidize readily to such acids, are herbicides which kill many plants including most common weeds when applied to the foliage as sprays, especially in aqueous sprays, for example, in concentrations of from 0.3% to 10%. The following undecylenates are especially effective herbicides: Undecylenic acid, methyl undecylenate, isobutyl undecylenamide, n-undecylenic aldehyde, brominated undecylenic acid, and polyethylene glycol (300) mono-undecylenate.

The undecylenates are derived from undecylenic acid, a relatively inexpensive compound which may be produced in various ways, notably as a fraction of castor oil. The compounds are relatively insoluble in water but may be dispersed in water with suitable solubilizers and emulsifiers. Suitable compositions comprising the compounds dispersed in water may be prepared by adding, for example, Solvesso 100 oil, Cellosolve, and Emulfor Ela, to the compounds and diluting with water. The results of the application of aqueous spray compositions of undecylenic acid in various concentrations to many weeds and crop plants are illustrated in Table I. Our application Serial No. 171,574, filed June 30, 1950, covers a method of using undecylenates for herbicidal purposes.

Chloroacetic acid is not only an effective plant regulant but it has commercial and practical advantages because of its availability, low cost, and relatively high solubility in water. One of the unexpected and important characteristics of chloroacetic acid is that it can be readily taken up by one part of the plant and translocated to another part. If taken up by the roots, the chemical goes into the plant and kills the top of the plant. If applied to the top of the plant, it will migrate to the roots where eventually the whole plant may be killed.

Chloroacetic acid has plant regulant properties when applied to various plants in concentrations from 0.10% to 10%. At concentrations of 0.3% to 10% the compound functions as a general herbicide, while at lower concentrations (0.3% to 3%) it functions as a selective herbicide whereby many common weeds may be killed entirely or partly without causing noticeable injury to certain crop plants such as corn, potatoes, grasses, gladioli, and the like. The results of using aqueous spray solutions of chloroacetic acid on common weeds and crop plants are shown in the tests of Table II. These tests show that sprays containing around 0.1% of the acid had no effect on either weeds or crop plants. Some plants could be killed with 1% solutions, while others required up to 10%. For complete killing, solutions containing less than 1% were not effective. When applied at the rate of 20 to 40 pounds per acre as a pre-emergence spray to soil, chloroacetic acid kills young weeds without causing injury to corn planted just before the spray is applied. Buds of potato tubers may be inhibited or killed without noticeable injury to the tuber. The effectiveness of soil applications of chloroacetic acid in killing young tomato plants (screening test) is illustrated in Table III. Our application Serial No. 171,573, filed June 30, 1950, covers a method of using chloroacetic acid for herbicidal purposes.

When an undecylenate, for example undecylenic acid, and chloroacetic acid are used conjointly or in combination in the same spraying medium, the effect is more pronounced than the sum of the separate effects of the compounds. The tests of Table IV show either synergism or mutual activation in the greatly intensified killing action.

One explanation is that the intensified action is due to the activating effect the compounds exercise on each other. Regardless of the explanation of the cause of the improved result, the composition gives results not attainable with either compound used alone in comparable amounts. For example, chloroacetic acid is selective in its action in the killing of different kinds of plants. Undecylenic acid does not kill grasses in relatively low concentrations but in proper dosage will kill crabgrass without noticeable injury to lawn grasses. For example, crabgrass plants can be killed in late May and June without noticeable injury to Kentucky blue grass. However, the composition at relatively low concentrations is an effective killer of grasses.

The tests of the tables were carried out on greenhouse plants. The same tests were carried out on plants in the field with surprisingly better results.

TABLE I

*Minimum percentage concentrations of undecylenic acid sprays effective for inducing the responses indicated*

| Species | Column Number | | | | |
|---|---|---|---|---|---|
| | 1 | 2 | 3 | 4 | 5 |
| | Complete plant killing | Complete top killing | Severe foliage injury | Slight foliage injury [1] | No injury |
| Weeds: | | | | | |
| Clover | >1.0 | 1.0 | >0.32 | 0.32 | 0.1 |
| Chickweed | 3.2 | 1.0 | >0.32 | 0.32 | 0.1 |
| Oxalis | 3.2 | 1.0 | 0.32 | 0.1 | 0.032 |
| Galinsoga | 3.2 | 1.0 | 0.32 | <0.32 | <0.32 |
| Amaranthus | 1.0 | 1.0 | 0.32 | <0.32 | <0.32 |
| Chenopodium | 1.0 | 1.0 | 0.32 | <0.32 | 0.1 |
| Smartweed | 3.2 | 3.2 | 1.0 | 0.32 | 0.1 |
| Purslane | 1.0 | 1.0 | 0.32 | <0.32 | <0.32 |
| Crab grass | 3.2 | 1.0 | 0.32 | <0.32 | <0.32 |
| Water hyacinth | >3.2 | 3.2 | 1.0 | <1.0 | <1.0 |
| Alligator weed | >3.2 | 3.2 | 1.0 | <1.0 | <1.0 |
| Wild carrot | 1.0 | 1.0 | 0.32 | <0.32 | <0.32 |
| Algae | 1.0 | 1.0 | <1.0 | <1.0 | <1.0 |
| Crop Plants: | | | | | |
| Tomato | 1.0 | 1.0 | 0.32 | <0.32 | 0.1 |
| 3-4" corn | >3.2 | 3.2 | 0.32 | 0.1 | 0.032 |
| 18-24" corn (basal) | 3.2 | 3.2 | 1.0 | <1.0 | <1.0 |
| Gladiolus | 3.2 | 3.2 | 1.0 | <1.0 | <1.0 |
| 12" peach seedlings | >3.2 | >3.2 | 3.2 | 1.0 | <1.0 |
| Pine seedlings | >3.2 | >3.2 | 1.0 | <1.0 | <1.0 |
| Orchid | >1.0 | >1.0 | >1.0 | 1.0 | <1.0 |
| Taxus | >1.0 | >1.0 | >1.0 | >1.0 | 1.0 |
| Carnation | >1.0 | >1.0 | 1.0 | <1.0 | <1.0 |
| Sorghum | 1.0 | 1.0 | <1.0 | <1.0 | <1.0 |
| Lawn grasses | 3.2 | 1.0 | 0.32 | 0.1 | 0.032 |
| Barley | 3.2 | 1.0 | 0.32 | <0.32 | 0.1 |
| Buckwheat | 3.2 | 1.0 | 1.0 | 0.32 | 0.1 |

NOTE.—Apparently not translocated.
[1] Considered tolerant.

At the present time there is no satisfactory herbicide for applying to the weeds in rows of growing vegetables such as potatoes, carrots, cabbage, beans and the like where it is necessary to follow one crop with another. The compounds produce rapid killing of weeds and when sprayed between the rows of vegetables do not impart any objectionable taste to vegetables. Another important feature is that the compositions of the invention exhibit no objectionable residual effect in the soil. In fact, seeds can be planted the day after spraying the soil.

The compounds may be applied in such concentrations as to effect a mere defoliation or to the flowers or young set fruit (calyx stage) to effect blossom or fruit thinning. They may be applied, for example, to potato vines just before harvesting to kill the vines, without injury to the tubers.

We have found that chloropicrin increases the herbicidal properties of the composition causing a further intensified action. The effect is synergistic and enables the concentrations of the compounds to be reduced without a diminishing effect on the plants. Moreover, the chloropicrin has a pronounced herbicidal action on plants of a low order such as fungi, particularly soil-borne fungi.

TABLE II

*Minimum concentrations of chloroacetic acid ($CH_2ClCOOH$) sprays effective for inducing the responses indicated. Entire plant sprayed unless otherwise noted*

| Species | Column Number | | | | |
|---|---|---|---|---|---|
| | 1 | 2 | 3 | 4 | 5 |
| | Complete plant killing | Complete top killing | Severe top injury | Slight top injury [1] | No injury |
| Weeds: | | | | | |
| Amaranthus | 1.0 | 1.0 | 0.32 | >0.1 | 0.1 |
| Chenopodium | 1.0 | 1.0 | 0.32 | >0.1 | 0.1 |
| Chickweed | 1.0 | 1.0 | 0.32 | >0.1 | 0.1 |
| Clover | 1.0 | 1.0 | 0.32 | >0.1 | 0.1 |
| Crab grass | 3.2 | 3.2 | 1.0 | 0.32 | 0.1 |
| Galinsoga | 1.0 | 1.0 | 0.32 | >0.1 | 0.1 |
| Oxalis | 1.0 | 1.0 | 0.32 | 0.1 | <0.1 |
| Purslane | 1.0 | 1.0 | 0.32 | >0.1 | 0.1 |
| Smartweed | 1.0 | 1.0 | 0.32 | >0.1 | 0.1 |
| Wild carrot | 1.0 | 1.0 | 0.32 | >0.1 | 0.1 |
| Water hyacinth | 10.0 | 3.2 | 1.0 | >0.32 | 0.1 |
| Alligator weed | >10.0 | 10.0 | 3.2 | 1.0 | <1.0 |
| Algae | 10.0 | 10.0 | 1.0 | <1.0 | <1.0 |
| Crop plants: | | | | | |
| Barley | >1.0 | >1.0 | >1.0 | 1.0 | 0.32 |
| Buckwheat | 1.0 | 1.0 | 0.32 | >0.1 | 0.1 |
| 4-6" corn | 10.0 | 10.0 | 3.2 | 1.0 | 0.32 |
| 18-24" corn [2] | 10.0 | 10.0 | 10.0 | 3.2 | 1.0 |
| Euonymus | >10.0 | >10.0 | 10.0 | <10.0 | [3] 1.0 |
| Bean | 10.0 | 10.0 | 1.0 | <1.0 | <1.0 |
| Gladiolus [2] | >3.2 | >3.2 | >3.2 | >3.2 | 3.2 |
| Grasses (lawn) | >1.0 | >1.0 | >1.0 | 1.0 | 0.32 |
| Orchid | 1.0 | 1.0 | 1.0 | <1.0 | <1.0 |
| Peach (12") | 10.0 | 10.0 | [4] 3.2 | [4] 1.0 | 1.0 |
| Pinus (2 yr.) | >3.2 | >3.2 | 3.2 | >1.0 | 1.0 |
| Tomato | 0.32 | 0.32 | 0.32 | 0.1 | 0.032 |
| Sorghum | >1.0 | >1.0 | >1.0 | 1.0 | 0.32 |
| Potato | >1.0 | >1.0 | >1.0 | 1.0 | 0.32 |

[1] Considered tolerant.
[2] Basal 4-6" sprayed.
[3] Trace leaf spotting, no effect on buds or stems.
[4] Peach completely defoliated at 3.2 percent with no injury to stem or buds. At 1.0 percent partial defoliation (older leaves).

TABLE III

*Results obtained by applying chloroacetic acid ($CH_2ClCOOH$) to the soil of tomato plants growing in four-inch pots. Three plants to each treatment*

| No. cc. per 4" Pot | 1.0% | | | 0.32% | | | 0.1% | | |
|---|---|---|---|---|---|---|---|---|---|
| | Mg./Pot | Percent Kill | No. Days | Mg./Pot | Percent Kill | No. Days | Mg./Pot | Percent Kill | No. Days |
| 10 | 100 | 100 | 4 | 32 | [1] 30 | 3 | 10 | 0 | ----- |
| 20 | 200 | 100 | 3 | 64 | 100 | 3 | 20 | 0 | ----- |
| 40 | 400 | 100 | 2 | 128 | 100 | 3 | 40 | 30 | 6 |

[1] 1 plant dead, 2 plants basal collapse in 6 days at 32 mg. per 4" pot rate of application.

The following species were not injured when $CH_2ClCOOH$ was applied to the soil at the rate of 32 mg. per 4" pot:

Lawn grasses
Corn
Barley
Sorghum

We claim:

The plant regulant composition for killing plants comprising chloroacetic acid in an amount varying from 0.3% to 10% and undecylenic acid in an amount varying from 0.3% to 10%.

PERCY W. ZIMMERMAMN.
ALBERT E. HITCHCOCK.

TABLE IV

*Responses induced by applying chloroacetic acid [$CH_2ClCOOH$ (ClA)] and undecylenic acid (UN) alone and in mixtures as a foliage spray*

| Treatment | Tomato | | | | Chickweed | | | | Buckwheat | | | |
|---|---|---|---|---|---|---|---|---|---|---|---|---|
| | 24 hours' toxicity | | Killing | | 24 hours' toxicity | | Killing | | 24 hours' toxicity | | Killing | |
| | Foliage[1] | Stem | Percent | No. days | Foliage[1] | Stem[2] | Percent | No. days | Foliage[1] | Stem[2] | Percent | No. days |
| ClA 1% | Dead | Collapse | 100 | 3 | Dead | 0 | 100 | 3 | ++++ | 0 | 100 | 6 |
| ClA .32 | + | do | 100 | 3 | ++ | 0 | 100 | 3 | + | 0 | 0 | |
| UN 1.0 | + | do | 0 | | ++++ | 0 | 0 | | ++++ | +++ | 0 | |
| UN 0.32 | 0 | do | 0 | | + | 0 | 0 | | + | 0 | 0 | |
| ClA .32 + UN .32 | Dead | do | 100 | 3 | Dead | +++ | 100 | 3 | ++ | ++ | 50 | 6 |
| ClA .32 + UN 1.0 | do | Dead | 100 | 1 | do | Dead | 100 | 1 | Dead | +++ | 100 | 3 |
| ClA 1.0 + UN .32 | do | Collapse | 100 | 3 | do | do | 100 | 1 | do | Dead | 100 | 1 |
| ClA 1.0 + UN 1.0 | do | Dead | 100 | 1 | do | do | 100 | 1 | do | do | 100 | 1 |

[1] Foliage:
++++ = 95% foliage killed.
+++ = 75-90% foliage killed.
++ = 50-60% foliage killed.
+ = 25% foliage killed.

[2] Stem:
++++ = 80% stems collapsed.
+++ = 50% stems collapsed.
++ = 25% stems collapsed.

REFERENCES CITED

The following references are of record in the file of this patent:

UNITED STATES PATENTS

| Number | Name | Date |
|---|---|---|
| 2,282,732 | Lean | May 12, 1942 |

OTHER REFERENCES

"The Chemistry and Uses of Insecticides," de Ong (1948), pages 173 and 174.

Chemical Abstracts, vol. 42, col. 3803H (1948), abstract of article by Brodersen et al.